United States Patent [19]

Lauck et al.

[11] Patent Number: 4,741,917

[45] Date of Patent: May 3, 1988

[54] ALKALI METAL ACID PYROPHOSPHATE LEAVENING ACID COMPOSITIONS AND METHODS FOR PRODUCING THE SAME

[75] Inventors: Robert M. Lauck, New City; Robert H. Tieckelmann, Ossining, both of N.Y.

[73] Assignee: Stauffer Chemical Co., Westport, Conn.

[21] Appl. No.: 909,155

[22] Filed: Sep. 19, 1986

[51] Int. Cl.$^4$ .............................................. A21D 10/02
[52] U.S. Cl. .................................... 426/551; 426/563; 426/653
[58] Field of Search ....................... 426/551, 563, 653; 423/305, 307

[56] References Cited

U.S. PATENT DOCUMENTS

| | | |
|---|---|---|
| 1,834,747 | 12/1931 | Stokes et al. |
| 2,408,258 | 9/1946 | Hetzel et al. ........................ 23/106 |
| 2,532,281 | 12/1950 | Barch ..................................... 99/95 |
| 2,630,372 | 3/1953 | Wright, Jr. ........................... 23/106 |
| 2,796,324 | 6/1957 | Russell ................................. 23/106 |
| 2,844,437 | 7/1958 | Kramer et al. ...................... 23/106 |
| 2,870,017 | 1/1959 | Barch ..................................... 99/95 |
| 3,034,899 | 5/1962 | Tucker .................................... 99/95 |
| 3,052,549 | 9/1962 | Kichline et al. ....................... 99/95 |
| 3,210,154 | 10/1965 | Klein et al. .......................... 23/106 |
| 3,297,449 | 1/1967 | Baker et al. ........................... 99/95 |
| 3,397,947 | 8/1968 | Shaver .................................. 23/106 |
| 4,230,730 | 10/1980 | Lauck .................................. 426/128 |

FOREIGN PATENT DOCUMENTS 976803  10/1975  Canada .

OTHER PUBLICATIONS

Hawley "The Condensed Chemical Dictionary" 10th Edition (1982) pp. 634–635.

Primary Examiner—R. B. Penland
Attorney, Agent, or Firm—Paul J. Juettner

[57] ABSTRACT

The rate of reaction of alkali metal acid pyrophosphate leavening acids can be stabilized significantly while still providing a leavening system which will proof by blending the alkali metal pyrophosphate with an oxide or hydroxide of magnesium.

The leavening acid compositions of the invention find particular use in refrigerated canned doughs.

9 Claims, 1 Drawing Sheet

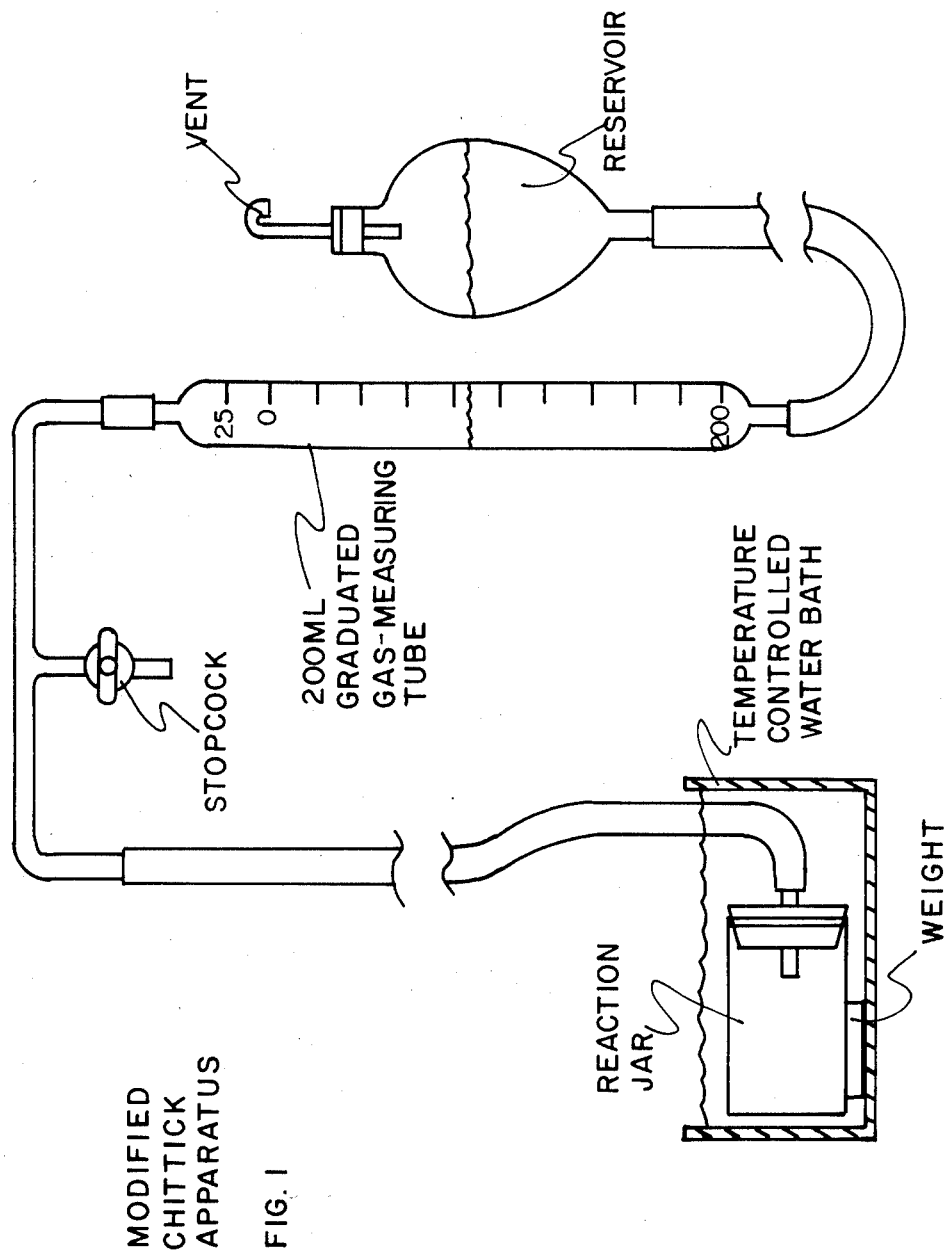

ALKALI METAL ACID PYROPHOSPHATE LEAVENING ACID COMPOSITIONS AND METHODS FOR PRODUCING THE SAME

The present invention relates to chemical leavening compositions and specifically those systems containing alkali metal acid pyrophosphates and also to methods for producing such compositions.

Refrigerated canned doughs are generally compositions packaged in foil-surfaced fiber containers having vent holes or other means to allow gas to escape. As the dough is proofed in the container, carbon dioxide is generated from the leavening system which expands the dough in the container and drives out the oxygen. The expanded dough seals the container. An internal gas pressure is required to maintain the seal and keep oxygen out of the container. The gas pressure must remain after refrigeration to maintain the seal. Failure to maintain the pressure will cause the dough to spoil due to bacteriological action. The dough must generate a sufficient amount of gas pressure to maintain the seal and not cause the containers to rupture while retaining sufficient leavening to allow the product to rise when baked.

The leavening systems used in refrigerated canned doughs must develop gas at a sufficiently slow rate initially to allow for mixing and handling. If too much gas is released during mixing, not enough will remain for sealing the container (proofing). If a large amount of gas is generated after mixing but before the dough is placed in the can, the dough can puff causing problems in loading the proper dough weight into the container. After proofing, the containers must retain the internal pressure. Some leavening systems have been known not to maintain the pressure within the container upon refrigeration.

Sodium acid pyrophosphate (hereinafter SAPP) has been found to be especially well suited to the needs of preleavened package doughs and is widely used for that purpose.

Sodium acid pyrophosphate is usually prepared commercially in several grades by reacting phosphoric acid containing trace quantities of stabilizing additives, such as aluminum, calcium and potassium ions, as disclosed, for example, in U.S. Pat. Nos. 2,844,437 and 2,408,258, with a sodium base to produce monosodium orthophosphate which is then converted to sodium acid pyrophosphate by heating at a temperature of about 200°-245° C. The addition of minor amounts of potassium, calcium and aluminum ions to the SAPP during manufacture permits the controlled retardation of the rate of reaction of the SAPP with the sodium bicarbonate in the baking system.

After the conversion to sodium acid pyrophosphate is substantially (e.g., about 94-96%) complete, the material is usually treated by either exposing it at elevated temperatures to an atmosphere containing steam at a partial pressure of about 100-760 millimeters of mercury for about ½ to 4 hours, or by reheating or continued heating at a temperature of about 200°-245° C. for prolonged periods, usually about 2 to 6 hours. Steam treatment is used primarily to promote stability in the inherently less stable fast-reacting grades of sodium acid pyrophosphate, whereas heat treatment is used to further depress the reaction rate of the slower reacting types.

Conversion and treatment of sodium acid pyrophosphate has been accomplished commercially by application of such conventional heating equipment as static heaters, rotary kilns, rotary flight heaters, drum dryers, rotary dryers and fluid bed reactors.

Sodium acid pyrophosphate is only sufficiently slow for use in preparing refrigerated doughs if a mixing temperature of about 18°-21° C. is maintained in the mixing bowl. This is accomplished by pumping a refrigerated liquid through a jacketed mixing bowl.

The rate of reaction between an alkali metal acid pyrophosphate leavening acid and a bicarbonate can be reduced when the baking compositions containing the alkali metal acid pyrophosphate contain small amounts of a material which furnishes calcium ions when it is dissolved in water, such as lime or the water used to make the dough containing calcium ion such as from milk or calcium chloride. The rate can be further reduced if a water-soluble alkali metal polyphosphate having a chain length greater than 8 is present in combination with the lime (U.S. Pat. No. 3,052,549). The exact mode of rate retardation is not known though the calcium compound may affect the SAPP physically such as forming a coating. While the "calcium ion effect" does reduce the rate of reaction, the rate is sufficiently high as to continue to require the use of a jacketed apparatus to prevent undue gassing prior to packing of the biscuits in the container.

BRIEF SUMMARY OF THE INVENTION

In accordance with the present invention it has been found that the stability of alkali metal acid pyrophosphate leavening acids can be significantly improved while still providing a leavening system which will proof, when required, and provide sufficient leavening to provide a final product of desirable characteristics without using calcium. The invention is achieved by blending alkali metal pyrophosphate with an oxide or hydroxide of magnesium. The combination of the alkali metal acid pyrophosphate leavening acid and the oxide or hydroxide of magnesium provides product stability lacking in non-treated alkali metal acid pyrophosphate. This is surprising as there is not "calcium ion effect" and the magnesium compounds are essentially insoluble.

The leavening acid compositions of the invention find particular use in refrigerated canned doughs.

BRIEF DESCRIPTION OF THE DRAWING

FIG. 1 is a representation of an apparatus used to measure the volume of gas evolved from a dough during leavening.

DETAILED DESCRIPTION OF THE INVENTION

The alkali metal acid pyrophosphates (sodium and/or potassium) can be prepared as usual in the industry with the normal heat and/or steam treatments. The preferred compound is sodium acid pyrophosphate (hereinafter SAPP) and the reference to the same hereinafter is intended to include "alkali metal acid pyrophosphate".

The SAPP is blended with an oxide or hydroxide of magnesium. As used hereinafter, the term "magnesium oxide or MgO" will be used to include the oxide or hydroxide. The MgO is added to the SAPP as dry particles preferably having a particle size ranging from about 1 micron to about 50 micron and, preferably, an LOI of less than 10%. The SAPP preferably has a particle size ranging from about 1 micron to about 100 micron and, preferably, an LOI of less than 5%.

The SAPP and the magnesium oxide/hydroxide are blended sufficiently to homogeneously disperse the oxide and hydroxide. Any equipment which will effect the blending can be used such as a Patterson-Kelley Twin Shell blender (preferred), drum blender and the like.

The blending is carried out in the absence of water or fluids. The blending time can vary from apparatus to apparatus and can vary, for example, from 15 minutes to 2 hours depending on the force applied. The blending can be carried out at room temperature or under heating or cooling as desired. The blending can be carried out in a single (preferred) step or multiple steps. The SAPP or the MgO can be partially milled to reduce particle size prior to the addition of the other material.

The SAPP is used in a weight ratio to the MgO ranging from about 10:1 to about 1000:1, and preferably from about 50:1 to about 500:1. The amount of MgO used is, preferably, sufficient to react with a majority and preferably substantially all (at least 85%) of the acidic sites on the SAPP surface.

Other ingredients such as tricalcium phosphate and magnesium carbonate can be included during or after blending. The SAPP of the invention can be blended with ingredients normally used in combination with SAPP such as sodium bicarbonate to form such compositions as "baking powder", a dry chemical leavening composition. Dried starch or flour is generally added to maintain separation of the ingredients.

The compositions of the present invention are effective in forming leavening acid compositions for baked goods. The leavening acid compositions of the invention can be used to leaven any baked product presently leavened by a chemical leavening agent. In particular, the leavening acid system of the invention can be used to replace the SAPP presently used in baking applications such as biscuits, doughnuts and the like. The gas-producing agent used in the formulation is generally sodium bicarbonate. The procedure for preparing the baked goods using the leavening acids of this invention are standard procedures normally connected with that product.

It is particularly effective to utilize the leavening composition of the present invention in canned, refrigerated biscuits which require a low gas generation during mixing and canning, the ability to develop pressure to seal the can upon proofing and the ability to maintain the pressure in the can under refrigeration. Biscuits are generally prepared from flour, sugar, salt, shortening, a leavening system of an alkaline bicarbonate and a leavening acid, water, and optionally milk solids. Additional components in minor amounts can include flavor and coloring agents, nutrient supplements, preservatives, antioxidants and reducing agents. In addition to the leavening acids of the present invention, small amounts of other leavening acids can be added to further provide for a wide range leavening activity. Illustrative acids suitable for such use include sodium aluminum phosphate, glucono delta lactone, anhydrous monocalcium phosphate, monocalcium phosphate monohydrate and the like. The products of the present invention can be formulated into baking powders and self-rising flour formulations which are well known in the art.

While it is desirable that the stabilization be provided by the addition of MgO, the formulation for the baked product can contain any material which furnishes calcium ions for rate reduction either when it is admixed with the leavening composition of the invention and/or when it is dissolved in water including water soluble calcium salts of inorganic acids, water soluble calcium salts of organic acids and calcium oxide/hydroxide. Calcium chloride can be used as a partial calcium source in the practice of the invention provided an appropriate neutral buffer such as sodium benzoate is used at the same time to maintain baking composition at about neutrality. Examples of water ionizable materials which contain calcium as one of their ions and which are relatively inexpensive and can be used without particular concern about buffers, taste, odor and the like are calcium hydroxide, calcium sulfate and calcium lactate.

Since the compositions of the present invention are generally intended for use in baking, all materials used in the preparation of these compositions should be food grade and should not strongly effect pH, taste or smell of the baked goods.

The present invention will be more fully illustrated in the Examples which follow:

EXAMPLES

Monosodium phosphate (MSP) from which the SAPP was converted contained 0.14% aluminum, 0.24% calcium and 0.11% potassium by analysis. The MSP was converted to SAPP at 225° C. with heat and without steam. MgO additions were 0.3% MgO based on the weight of the SAPP. MgO blending was conducted by solid-solid admixing in a Patterson-Kelley Twin Shell dry blender for 30 minutes.

The samples of this Example were evaluated for the rate at which $CO_2$ gas was evolved from a sodium acid pyrophosphate-sodium bicarbonate reaction in a dough medium. A standard dough containing the test SAPP is prepared in a Farinograph mixing bowl. The dough is then transferred to a modified Chittick apparatus as shown in FIG. 1 and the volume of gas evolved is measured over specific time intervals.

290.8 grams of hard wheat biscuit flour were placed in a Farinograph mixing bowl and the mixer activated. The Farinograph water bath temperature was 16° C. and the speed was 63 rpm. While mixing, a solution containing 168.2 grams of water and 5.0 milliliters of calcium chloride solution (0.75 grams $CaCl_2$ with 99.25 grams distilled water) at 22° C. was added quickly (over a 5 second period). Upon the completion of the water addition, the interior walls of the Farinograph bowl were scraped down. Mixing was continued for 5 minutes.

Over a 5 second period, a previously blended leavening premix comprising 6.1 grams of sodium bicarbonate, 1.9 grams of potassium chloride, 4.5 grams of sodium chloride, 16.0 grams of dextrose and 8.3 grams of the SAPP being tested was added to the center of the Farinograph bowl and mixing was continued for 3 minutes. Immediately after addition of the leavening premix, the interior walls of the Farinograph bowl were scraped down to insure proper mixing of ingredients.

After turning off the mixer, a 200 gram sample of dough was cut and placed into a wide mouth weighted reaction jar of the Chittick apparatus, the jar was stoppered, connected to the apparatus and then submerged in a water bath maintained at about 21° C. with the stop cock set at open. Dough temperature is critical for the test and was maintained with ±0.8° C.

At exactly 5 minutes from the end of the dough mixing or 8 minutes after addition of the leavening premix, the reservoir of the Chittick apparatus was adjusted to read 0 on the graduated gas measuring tube, the stop cock was closed and the reservoir lowered so that the liquid level in the reservoir was about 2 inches below that in the gas measuring tube.

The volume of gas evolved from the dough sample was measured at 10, 30 and 60 minutes by raising the reservoir to line up its liquid level with the liquid level in the gas measuring tube. After each reading, the reservoir liquid level was lowered about 2 inches below the liquid level in the gas measuring tube.

Samples were subjected to an accelerated aging test. All samples were placed in a dessicator and subjected to a 75% relative humidity at 15.5° C. a the period of time of 1.5 hours. The stability of the compositions was measured by their ability to generate gas as measured by the Chittick test. The following results were obtained:

TABLE I

SAPP STABILITY STUDY

| Example No. | SAPP Sample | Mg—(OH)$_2$ | Humid-ified | Result of Chittick Test After Humidification Treatment* (In Minutes) | | |
|---|---|---|---|---|---|---|
| | | | | 10 | 30 | 60 |
| 1 | 1 | X | | 5.25 | 15 | 31.5 |
| 2 | 1 | X | X | 8 | 20 | 44.5 |
| 3 | 1 | | | 5 | 19 | 44 |
| 4 | 1 | | X | 12 | 57 | 244 |
| 5 | 2 | X | | 5 | 14 | 31 |
| 6 | 2 | X | X | 7 | 18 | 37.5 |
| 7 | 2 | | | 4.3 | 13 | 30.3 |
| 8 | 2 | | X | 12 | 44 | 167 |
| 9 | 3 | | | 4.5 | 13.5 | 31 |
| 10 | 3 | | X | 9 | 24 | 53 |
| 11 | 4 | | X | 22.5 | 142 | 200** |

*Milliliters of gas evolved
**After 38 minutes

As it can be seen from the foregoing data, Mg(OH)$_2$ was effective in maintaining the stability of the SAPP even under strenuous humidity aging. Samples subjected to humidity aging without Mg(OH)$_2$ showed an increase of rate of over 400 percent. Magnesium hydroxide showed a reduction in the rate of gas evolution of 28% in one case and none in another (compare Examples 1 and 3; 5 and 7). Thus, magnesium does not show the calcium ion effect. Surprisingly, magnesium hydroxide acts to stabilize the SAPP without causing a significant reduction in reaction rate. In Table II are listed the reaction conditions for the measurement of the gas rates in Table I.

TABLE II

| Example No. | Room Temp. | Chittick Water Bath Temp. | Farinograph Water Bath Temp. | Dough Temp. |
|---|---|---|---|---|
| 1 | 25.5 | 24.2 | 17 | 21.2 |
| 2 | 25 | 24.7 | 15.8 | 20.7 |
| 3 | 25 | 24.7 | 16.3 | 21.4 |
| 4 | 25 | 24.4 | 15.5 | 20.7 |
| 5 | 25.5 | 25 | 16 | 21.1 |
| 6 | 25.5 | 24.4 | 16.3 | 21.1 |
| 7 | 25.5 | 24.2 | 16 | 21.1 |
| 8 | 25.5 | 24.2 | 16.3 | 21 |
| 9 | 24.2 | 24.2 | 16 | 21 |
| 10 | 25 | 24.4 | 16 | 21 |

TABLE II-continued

| Example No. | Room Temp. | Chittick Water Bath Temp. | Farinograph Water Bath Temp. | Dough Temp. |
|---|---|---|---|---|
| 11 | 25.5 | 24.7 | 16.2 | 21.4 |

Comparative examples were run using 0.3% calcium hydroxide, an equimolar amount of magnesium hydroxide, an equimolar amount of CaCl$_2$ in the dough make-up water and an equimolar 50:50 blend of CaCl$_2$ and Mg(OH)$_2$. Rates of reaction were determined using the Chittick apparatus with the following results:

| | Mls Gas Released |
|---|---|
| SAPP control | 37 |
| SAPP with 0.3% lime | 26 |
| SAPP with equimolar Mg(OH)$_2$ | 33 |
| SAPP with equimolar CaCl$_2$ in make-up water | 31.5 |
| SAPP with CaCl$_2$ and Mg(OH)$_2$ | 28.5 |

From this data it can be seen that Mg(OH)$_2$ provides about the same rate reduction as using CaCl$_2$ in the make-up water. Both of these are half the rate reduction provided by blending lime with the SAPP.

What is claimed is:

1. A method for stabilizing an alkali metal acid pyrophosphate against significant leavening rate of reaction change comprising blending said alkali metal acid pyrophosphate with an effective amount of magnesium oxide, hydroxide or mixtures thereof.

2. The method as recited in claim 1 wherein the alkali metal acid pyrophosphate is sodium acid pyrophosphate.

3. The method as recited in claim 1 wherein the magnesium oxide or hydroxide is magnesium hydroxide.

4. The method as recited in claim 1 wherein the magnesium oxide or hydroxide is magnesium oxide.

5. The method as recited in claim 1 wherein the magnesium oxide or hydroxide is used in a ratio to the alkali metal acid pyrophosphate ranging from about 1:10 to about 1:1000.

6. The method as recited in claim 2 wherein the magnesium oxide or hydroxide is magnesium hydroxide and is used in a ratio to said sodium acid pyrophosphate ranging from about 1:10 to about 1:1000.

7. A method for preparing chemically leavened baked goods which comprises leavening the baked goods with a leavening system comprising an alkali metal bicarbonate and a blend of sodium acid pyrophosphate and an effective amount of magnesium oxide, hydroxide or mixtures thereof.

8. A stabilized alkali metal acid pyrophosphate stabilized against significant leavening rate of reaction changes consisting essentially of a blend of sodium acid pyrophosphate with a stabilizing effective amount of magnesium oxide, hydroxide or mixtures thereof.

9. A stabilized alkali metal acid pyrophosphate as recited in claim 8 wherein the magnesium oxide or hydroxide is magnesium hydroxide and is used in a ratio to said sodium acid pyrophosphate ranging from about 1: 10 to about 1:1000.

* * * * *